US008401366B2

(12) United States Patent
Barton (10) Patent No.: US 8,401,366 B2
(45) Date of Patent: Mar. 19, 2013

(54) METHOD AND APPARATUS FOR DOWNLOADING ANCILLARY PROGRAM DATA TO A DVR

(75) Inventor: James M. Barton, Alviso, CA (US)

(73) Assignee: TiVo Inc., Alviso, CA (US)

( * ) Notice: Subject to any disclaimer, the term of this patent is extended or adjusted under 35 U.S.C. 154(b) by 1175 days.

(21) Appl. No.: 11/981,417

(22) Filed: Oct. 30, 2007

(65) Prior Publication Data
US 2008/0145034 A1 Jun. 19, 2008

Related U.S. Application Data (60) Provisional application No. 60/855,890, filed on Oct. 31, 2006.

(51) Int. Cl.
*H04N 5/76* (2006.01)
*H04N 9/80* (2006.01)
(52) U.S. Cl. ........ 386/239; 386/249; 386/248; 386/262; 725/40
(58) Field of Classification Search ............. 386/239, 386/249, 248, 262; 725/40
See application file for complete search history.

(56) References Cited

U.S. PATENT DOCUMENTS

| 5,797,001 | A * | 8/1998 | Augenbraun et al. ....... 725/40 |
| 5,973,685 | A | 10/1999 | Schaffa et al. |
| 6,141,447 | A | 10/2000 | Linzer et al. |
| 6,181,746 | B1 | 1/2001 | Hoshi |
| 7,456,760 | B2 | 11/2008 | Normile et al. |
| 7,734,116 | B2 | 6/2010 | Panabaker et al. |
| 2001/0049820 | A1 | 12/2001 | Barton |
| 2002/0120925 | A1 | 8/2002 | Logan |
| 2002/0123928 | A1 | 9/2002 | Eldering et al. |
| 2002/0129360 | A1 | 9/2002 | Lee |
| 2002/0138831 | A1 | 9/2002 | Wachtfogel et al. |
| 2002/0144262 | A1 | 10/2002 | Plotnick et al. |
| 2003/0088872 | A1 | 5/2003 | Maissel et al. |
| 2003/0145323 | A1 | 7/2003 | Hendricks et al. |
| 2003/0149975 | A1 | 8/2003 | Eldering et al. |

(Continued)

FOREIGN PATENT DOCUMENTS

| EP | 1199890 A2 | 4/2002 |
| JP | 2001-285777 | 10/2001 |

(Continued)

OTHER PUBLICATIONS

The State Intellectual Property Office of the People's Republic of China, Application No. 200780040475.1, dated Nov. 30, 2010, 8 pages.

(Continued)

*Primary Examiner* — Helen Shibru
(74) *Attorney, Agent, or Firm* — Hickman Palermo Truong Becker Bingham Wong LLP; Kirk D. Wong (57) ABSTRACT

A method and apparatus for downloading ancillary program data to a DVR. An embodiment allows multimedia device users to select programs to record or download movie or music over a network, such as the Internet, from a content provider. The system automatically downloads and stores ancillary program data that is directly related to, and associated with, a program that has been selected for recording or content requested for download. When a user selects a program to view the user is offered the opportunity to browse ancillary program data associated with the program and view an ancillary program data. The service can charge the content provider or an advertiser for each time their ancillary program data is viewed by a user. The ancillary programming is deleted when the associated recorded program is deleted.

26 Claims, 5 Drawing Sheets

U.S. PATENT DOCUMENTS

| | | | |
|---|---|---|---|
| 2004/0003397 A1 | 1/2004 | Boston et al. |
| 2004/0015608 A1 | 1/2004 | Ellis et al. |
| 2004/0148454 A1 | 7/2004 | Seo |
| 2004/0179825 A1 | 9/2004 | Im |
| 2004/0268387 A1 | 12/2004 | Wending |
| 2004/0268413 A1 | 12/2004 | Reid et al. |
| 2005/0010950 A1 | 1/2005 | Carney et al. |
| 2005/0074063 A1 | 4/2005 | Nair et al. |
| 2005/0076359 A1 | 4/2005 | Pierson et al. |
| 2005/0086703 A1 | 4/2005 | Gupta et al. |
| 2005/0273828 A1 | 12/2005 | Barton |
| 2005/0278747 A1 | 12/2005 | Barton et al. |
| 2005/0289588 A1 | 12/2005 | Kinnear |
| 2005/0289636 A1 | 12/2005 | Schiller |
| 2006/0029364 A1 | 2/2006 | Kosugi |
| 2006/0041902 A1 | 2/2006 | Zigmond |
| 2006/0088279 A1 | 4/2006 | Tsunashima et al. |
| 2006/0100928 A1 | 5/2006 | Walczak et al. |
| 2006/0161947 A1 | 7/2006 | Laksono et al. |
| 2006/0184579 A1 | 8/2006 | Mills et al. |
| 2006/0223593 A1 | 10/2006 | Ishak |
| 2007/0100690 A1 | 5/2007 | Hopkins |
| 2008/0013622 A1 | 1/2008 | Bao et al. |
| 2008/0060002 A1 | 3/2008 | Noll et al. |
| 2008/0062018 A1 | 3/2008 | Normile et al. |
| 2008/0127249 A1 | 5/2008 | Cruice |
| 2009/0135901 A1 | 5/2009 | Au et al. |

FOREIGN PATENT DOCUMENTS

| | | |
|---|---|---|
| JP | 2004-304405 | 10/2004 |
| WO | WO 01/91474 A2 | 11/2001 |
| WO | WO 02/41199 A | 5/2002 |
| WO | WO 02/43385 A2 | 5/2002 |
| WO | WO 02/082374 A2 | 10/2002 |
| WO | WO 03/010965 A1 | 2/2003 |
| WO | WO 03/075569 A2 | 9/2003 |
| WO | WO 2005/034503 A2 | 4/2005 |
| WO | WO 2005/107253 A1 | 11/2005 |
| WO | WO 2006/091313 | 8/2006 |

OTHER PUBLICATIONS

Claims for Application No. 200780040475.1, 7 pages.
International Search Report for application no. PCT/IUS07/83059 dated Mar. 18, 2008 (3 pgs).
Written Opinion for application No. PCT/IUS07/83059 dated Mar. 18, 2008 (5 pgs).
Microsoft Press Computer Dictionary, Definition of "Queue" (Third edition), Aug. 1997, 1 page.
DICTIONARY.COM, Definition of "Queue", retrieved from [URL:http://dictionary.reference.com/browse/queque] on Apr. 5, 2011, 2 pages.
Australian Patent Office, "Foreign Office Action", application No. 2007314276, applicant: Tivo Inc., dated Mar. 28, 2011, 3 pages.
Claims, Australian application No. 2007314276, applicant: Tivo Inc., 5 pages, Mar. 2011.
Examiner's First Report for Australian patent application No. 2007313659, dated Apr. 13, 2010, 3 pages.
Current claims for Australian patent application No. 2007313659, 6 pages.
Examiner's First Report for Australian patent application No. 2007314276, dated Apr. 20, 2010, 2 pages.
Current claims for Australian patent application No. 2007314276, 5 pages.
Examiner's First Report for Australian patent application No. 2007313700, dated May 6, 2010, 2 pages.
Current claims for Australian patent application No. 2007313700, 6 pages.
State Intellectual Property Office of the People's Republic of China, Notification of the Second Office Action, dated Apr. 25, 2011 (English translation), Chinese Patent Application No. 200780038448.0, 6 pages.
Pending Claims as of Apr. 25, 2011 of Chinese Patent Application No. 200780038448.0, 4 pages.

Canadian Intellectual Property Office, "Office Action", Application No. 2,662,665, Applicant: Tivo Inc., Dated May 31, 2011, 2 pages.
Current Claims, Application No. 2,66,665, Applicant: Tivo Inc., dated May 2011, 12 pages.
The State Intellectual Property Office of the People's Republic of China, Notification of the First Office Action in Application No. 200780040475.1, dated Nov. 30, 2010, 8 pages.
International Search Report and Written Opinion for PCT application No. PCT/US07/23049 dated Mar. 14, 2008, 6 pages.
Examiner's First Report for Australian patent application No. 2007314276 dated Apr. 20, 2010, 2 pages.
AU Application No. 2007314276, references filed under Section 27(1) of the Patent Act of 1990, dated Aug. 20, 2010, 7 pgs.
AU Application No. 2007314276, current claims, 5 pgs.
State Intellectual Property Office of the People's Republic of China Notification of First Office Action for Chinese Patent Application No. 200780038448.0 mailed Sep. 1, 2010, 13 pages.
Claims as of Sep. 1, 2010 for Chinese Patent Application No. 200780038448.0 mailed Sep. 1, 2010, 7 pages.
State Intellectual Property Office of the People's Republic of China Notification of Third Office Action for Chinese Patent Application No. 200780038448.0 mailed Aug. 5, 2011, 8 pages.
Claims as of Aug. 5, 2011 for Chinese Patent Application No. 200780038448.0, 5 pages.
The State Intellectual Property Office of the People's Republic of China, "Notification of the Fourth Office Action" mail date Jun. 5, 2012, Chinese Patent Application No. 200780038448.0, 9 pages.
Claims as of Jun. 5, 2012 in Chinese Patent Application No. 200780038448.0, 5 pages.
Canadian Intellectual Property Office, Office Action mailed Jun. 8, 2012 in Canadian Patent Application No. 2,662,825, 2 pages.
Claims as of Jun. 8, 2012 in Canadian Patent Application No. 2,662,825, 6 pages.
Australian Patent Office, "Patent Examination Report No. 1", mail date Jun. 26, 2012 in Australian Patent Application No. 2011200369, 3 pages.
Claims as of Jun. 26, 2012 in Australian Patent Application No. 2011200369, 3 pages.
Japan Patent Office, "Decision of Rejection", in application No. 2009-534947, dated Aug. 7, 2012, 3 pages.
Current Claims in application No. 2009-534947, dated 2012, 6 pages.
European Patent Office, "Office Action", in application No. 07 839 886.4-1238, dated Jul. 13, 2012, 7 pages.
Current Claims in application No. 07 839 886.4-1238, dated 2012, 4 pages.
Intellectual Property Office of Singapore, "Search and Examination Report" received in Singapore Patent Application No. 200902702-0, dated Aug. 10, 2012, 9 pages.
Claims, PCT/US07/83201, 6 pages, Oct. 31, 2007.
International Searching Authority, "Notification of Transmittal of the International Search Report and the Written Opinion of the International Searching Authority, or the Declaration," PCT/US07/83201, May 20, 2008, 9 pages.
Claims, PCT/US07/83059, 6 pages, Oct. 30, 2007.
International Searching Authority, "Notification of Transmittal of the International Search Report and the Written Opinion of the International Searching Authority, or the Declaration," PCT/US07/83059, Mar. 18, 2008, 9 pages.
European Patent Office, Extended European Search Report received in European patent application No. 07863721.2, dated Mar. 29, 2012, 8 pages.
Claims as of Mar. 29, 2012 in European patent application No. 07863721.2, 3 pages.
Hungarian Patent Office, International Search Report and Written Opinion, Singapore Patent Application No. 2009027020, dated Jul. 15, 2010, 23 pages.
Singapore Patent Application No. 2009027020, Claims as of Jul. 15, 2010, 6 pages.
Canadian Intellectual Property Office, Application No. 2,665,731, Office Action dated Nov. 26, 2010, 2 pages.
Canadian Application No. 2,665,731, Claims as of Nov. 26, 2010, 5 pages.

Canadian Intellectual Property Office, Application No. 2,665,731, Office Action dated Nov. 7, 2011, 2 pages.
Canadian Application No. 2,665,731, Claims as of Nov. 7, 2011, 8 pages.
Canadian Intellectual Property Office, Application No. 2,662,825, Office Action dated Dec. 14, 2010, 2 pages.
Canadian Application No. 2,662,825, Claims as of Dec. 14, 2010, 6 pages.
The State Intellectual Property Office of the People's Republic of China, Notification of the Second Office Action, Chinese Patent Application No. 200780040918.7 dated Apr. 20, 2011, 11 pages. (English translation included).
Chinese Patent Application No. 200780040918.7, Claims as of Apr. 20, 2011, 3 pages.
The State Intellectual Property Office of the People's Republic of China, "Notification of the First Office Action", Chinese Patent Application No. 200780040918.7 dated Sep. 9, 2010, 21 pages. (English translation included).
Chinese Patent Application No. 200780040918.7, Claims as of Sep. 9, 2010, 5 pages.
European Patent Office, Extended European Search Report received in EP application No. 07844743.0, dated Oct. 4, 2011, 7 pages.
European application No. 07844743.0, Claims as of Oct. 4, 2011, 4 pages.
Notification of Reasons for Rejection received in Japanese Patent Application No. 2009-534947, dated Dec. 6, 2011, 4 pages. (English translation included).
Japanese Patent Application No. 2009-534947, Claims as of Dec. 6, 2011, 6 pages.
Notification of Reason for Rejection received in Japanese Patent Application No. 2009-534943, dated Jan. 4, 2012, 10 pages. (English translation included).
Japanese Patent Application No. 2009-534943, Claims as of Jan. 4, 2012, 8 pages.
Singapore Application No. 189554, Search Report dated Jul. 15, 2010, 20 pgs.
Singapore Application No. 189554, Written Opinion, dated Jul. 15, 2010, 10 pgs.
Singapore Application No. 189554, Current claims, 9 pgs, Oct. 31, 2007.
U.S. Appl. No. 11/982,256, filed Oct. 31, 2007, Final Office Action.

* cited by examiner

METHOD AND APPARATUS FOR DOWNLOADING ANCILLARY PROGRAM DATA TO A DVR

CROSS-REFERENCE TO RELATED APPLICATIONS; PRIORITY CLAIM

This application claims benefit of U.S. Provisional Appln. 60/855,890, filed Oct. 31, 2006, the entire contents of which is hereby incorporated by reference as if fully set forth herein, under 35 U.S.C. §119(e).

FIELD OF THE INVENTION

The invention relates to downloading and using ancillary broadcast program data to a digital video recorder.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Digital video recorders (DVRs) have become widely popular among consumers; quickly replacing VCRs as the consumers' main choice for viewing broadcast programs via cable, satellite, and terrestrial signals.

Like a VCR, a traditional DVR can be a single-purposed system dedicated to recording broadcast TV program content. A user tells the DVR what programs to record and the DVR records the programs on its local hard drive at prescribed times. During recording, the DVR changes the electrical signals of broadcast program content into digital information, such as MPEG data streams, and stores the digital information on the hard drive or directly stores pre-digitized TV signals on the hard drive.

At the playback stage, the user selects a program stored on the hard drive. The DVR retrieves the program from the hard drive and converts the program's digital information to analog or digital display signals. An attached TV set or monitor displays the program content of the signals on its screen. The majority of DVRs allow the user to perform operations such as play, fast forward, pause, and rewind on the program during playback.

However, DVRs, much like VCRs have been able to playback recorded programs with no other viewing options for the particular program. DVDs on the other hand allow the viewer to watch additional scenes or different angles of scenes. DVRs lack the ability to provide these types of features because they traditionally receive broadcast signals from terrestrial antennas, satellites, and cable. Those sources do not provide any type of ancillary program data in their signals.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for downloading ancillary program data to a DVR is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the following discussion, in references to the drawings like numerals refer to like parts throughout the several views.

Embodiments are described herein according to the following outline:
   1.0 General Overview
   2.0 Structural and Functional Description
      2.1 Advanced DVR architecture
      2.2 Ancillary data delivery and display
   3.0 Implementation Mechanisms—Hardware Overview
   4.0 Extensions and Alternatives
1.0 General Overview An embodiment allows multimedia device users to select programs to record using an electronic program guide (EPG). The user selects the program from the EPG and the multimedia device schedules a recording of the program. The multimedia device also allows users to order movies or music from content providers. The multimedia device then downloads the movie or music over a network, such as the Internet, from a content provider.

When the recording or download is complete, the multimedia device adds the recorded program or downloaded movie or music to a list of recorded material that the user can select from and play. The user interacts with the screen using a remote control or other remote input device.

The multimedia device knows what the user is going to record or has recorded or downloaded onto the multimedia device. An embodiment automatically downloads and stores ancillary program data that is directly related to, and associated with, a program that has been selected for recording or content requested for download. An embodiment can alternatively automatically download and store ancillary program data that is directly related to, and associated with, a program that has been recorded or content that has been downloaded. The ancillary program data can be downloaded to storage in the background while the multimedia device is performing other operations.

In an embodiment, when a user selects a program to view the user is offered the opportunity to browse ancillary program data associated with the program and view an ancillary program data. After the user views an ancillary program data, the user is returned to the list of ancillary program data. If there is any ancillary program data that can be viewed while the user is viewing the program or listening to music, the multimedia device can display an icon overlaid onto the program that indicates that the user can use his remote control to view the ancillary program data. This works when ancillary program data contains alternate scenes, different viewing angles for scenes, director's comments, music videos, etc., that add to the viewing enjoyment or enriches the viewing experience.

The list of ancillary program data delivered by the service might be according to value accorded to it by third parties through payments to the service, e.g., paid promotion. The multimedia device can report to the service as to which ancillary program data was viewed by the user. The service can charge the content provider or an advertiser for each time their ancillary program data is viewed by a user.

In an embodiment, the ancillary programming is deleted when the associated recorded program is deleted. In an embodiment, if a user tunes to a live television channel and views a broadcast program, download of ancillary program data or links begin immediately. If the channel is changed by the user then downloading is halted and any ancillary program data for that program is deleted automatically. Similarly, if the program ends and another begins, the old ancillary program data is discarded and a new list of ancillary program data fetched from the service.

In other aspects, the invention encompasses a computer apparatus and a computer-readable medium configured to carry out the foregoing steps.

2.0 Structural and Functional Description

DVRs have changed the way that the viewing public watches broadcast television programs. Advertisers have found that an increasing number of viewers are skipping commercials using commercial-skip and fast forward functions provided by the DVRs. Viewers can skip through commercials in programs that have been recorded by the DVR. Other DVRs offer a real-time rolling cache of a televised program. The cache can store 30+ minutes of the program, allowing the viewer to start watching the program many minutes after the program began. This gives the viewer enough of a buffer to watch the program and skip commercial breaks with having to watch the program in real-time.

The days of the shotgun approach to advertising where the advertisers attempt to target the viewer based on the program being broadcast are quickly becoming numbered. Advertisers can no longer be sure that a viewer will watch a commercial advertisement.

Further, movie producers have found that the DVD phase for their movies are the most profitable part of the movies lifespan. Worldwide DVD sales create longer and higher revenue streams than theater showings. Because of the importance of the DVD phase, movie producers have added many ancillary features (e.g., additional scenes, director's remarks, etc.) and uncut versions to the DVD that offer the viewer a richer viewing experience and give the viewer more information beyond the theater showing.

Broadcasters have grasped the digital age and have begun to televise DVD versions of movies that offer uncut scenes that were added especially for the DVD. However, there is much more that can be done to enhance a user's viewing experience with respect to broadcast programs. There is a very large amount of ancillary information that can be associated with a particular program that the broadcaster could provide to the user's DVR. This would require the broadcaster to somehow be informed that the user is recording the particular program. Alternatively, the DVR could have the intelligence to correlate the user's desire to record the particular program with available ancillary information. The current crop of DVRs do not have the intelligence or the ability to make such decisions and, further, do not have the ability to receive multimedia content in any other manner except via terrestrial, cable, or satellite connections.

An embodiment allows a DVR to receive ancillary program information via a network connection such as the Internet, in addition to any terrestrial, cable, or satellite connections. Additionally, such a system would evaluate a user's scheduled recordings to prefetch ancillary program information and/or perform simultaneous retrieval of ancillary program information during program recording and real-time user program viewing. An embodiment also allows a DVR to offer advertisers specific, targeted advertising and further enable broadcasters to enrich viewer experience by giving the viewer access to the ancillary features of DVDs that were not previously accessible by the viewing audience.

2.1 Advanced DVR Architecture

Figure 1A:
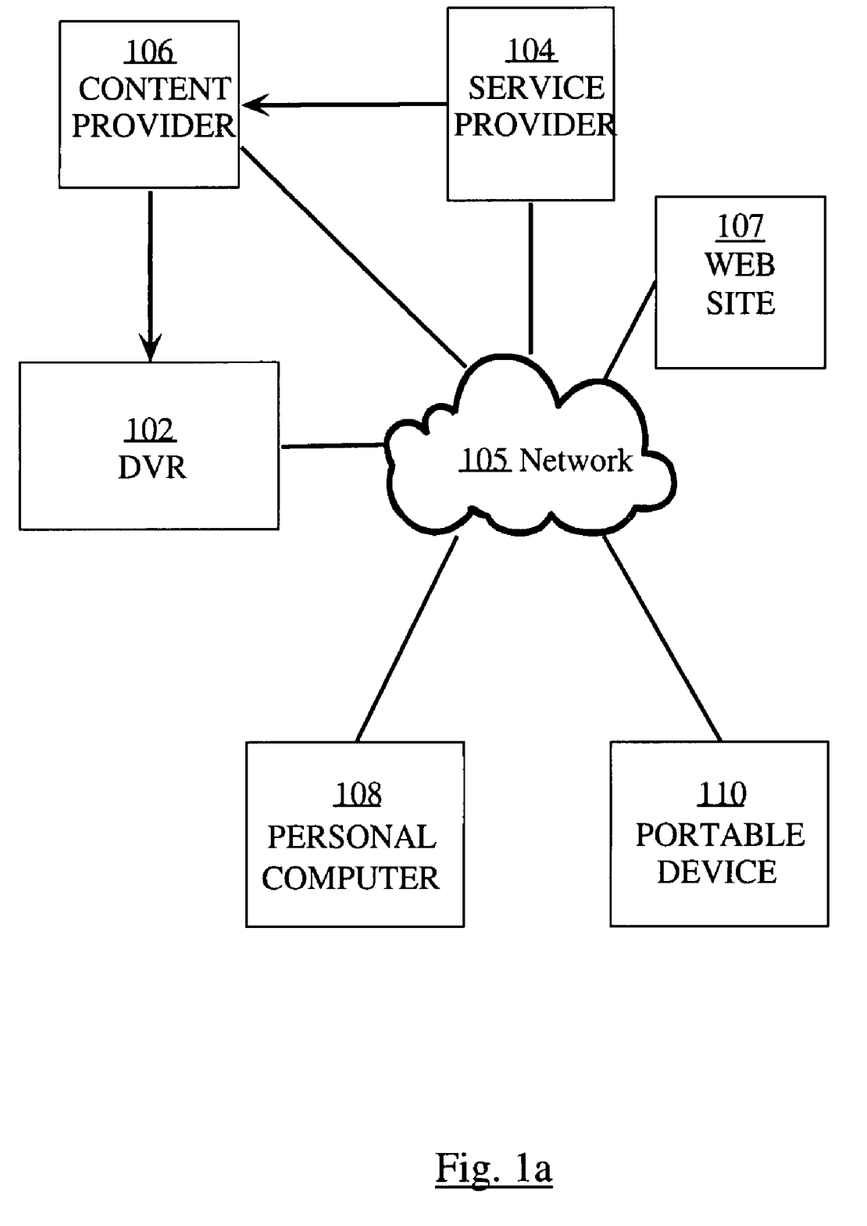
FIG. 1A is a block diagram that illustrates a service provider communicating across a network with a plurality of devices, according to an embodiment of the invention.

FIG. 1A illustrates an example system according to an embodiment. The system contains DVR 102 which is communicatively coupled to network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and is also coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102, personal computer 108, or portable device 110 can retrieve program content, multimedia content or ancillary program data from Web site 107.

In one embodiment, DVR 102 communicates with service provider 104, which provides program guide data, graphical resources (such as fonts, pictures, etc.), service information, software, advertisements, event identification data, and other forms of data that enable DVR 102 to operate independently of service provider 104 to satisfy user interests. In another embodiment, personal computer 108 or portable device 110 can communicate with the service provider 104 and receive the same types of data. In yet another embodiment, DVR 102, personal computer 108, and portable device 110 can communicate with each other to transfer content, metadata, or any other data through network 105 or any local network.

In another embodiment, content provider 106 may provide, to service provider 104, content data or any metadata, including promotional data, icons, web data, ancillary content data, and other information. Service provider 104 may then interpret the metadata and provide the content data metadata to DVR 102, personal computer 108, or portable device 110.

Figure 1B:
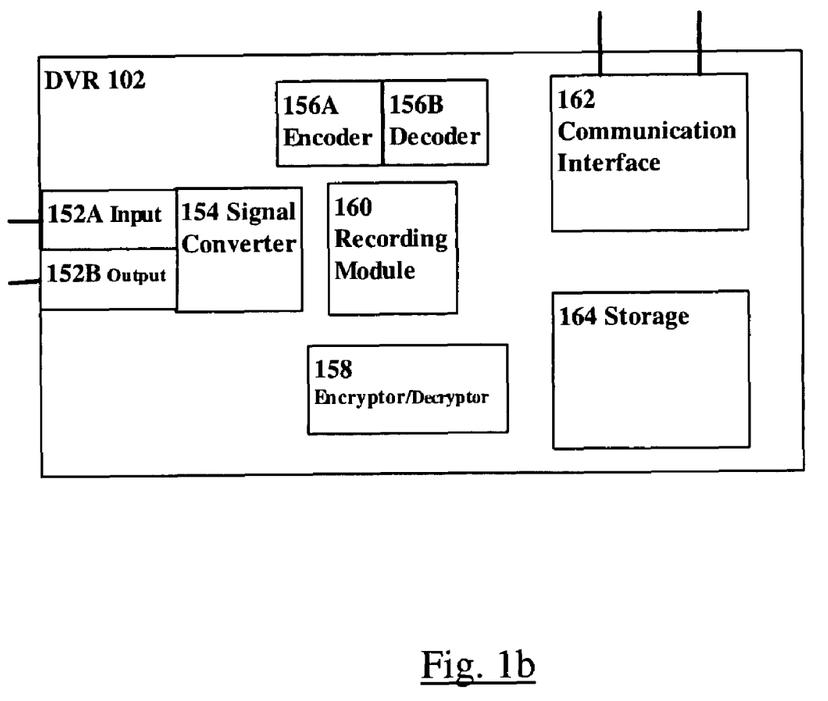
FIG. 1B is a block diagram illustrating a general overview of the components of a Digital Video Recorder (DVR), according to an embodiment of the invention.

Referring to FIG. 1B, in an embodiment, DVR 102 generally comprises a plurality of components, signified by Signal Converter 154, that are necessary to digitize an analog television signal and convert it into a digital data stream or accept a digital data stream. DVR 102 receives broadcast signals from an antenna, from a cable TV system, satellite receiver, etc., via Input 152A. Input 152A may comprise a plurality of tuning modules that allow a plurality of signals to be received and recorded simultaneously.

Recording Module 160 records the incoming data stream by storing the digital data stream on at least one storage facility, signified by Storage 164 that is designed to retain segments of the digital data stream. Storage 164 may be any type of storage device, e.g., hard disk, solid state disk, non-volatile storage, etc. A Signal Converter 154 retrieves segments of the data stream, convert the data stream into an analog signal, and then modulate the signal onto a RF carrier, via Output 152B, through which the signal is delivered to a standard TV set. Output 152B may alternatively deliver a digital signal to a TV set or video monitor. For example, DVR 102 may utilize a Digital Visual Interface port (DVI) for sending digital signals to a TV via a DVI cable or DVR 102 may utilize a High-Definition Multimedia Interface port (HDMI) for sending digital signals to a TV via a HDMI cable. A portable DVR or media player can utilize an internal display screen and optionally deliver a digital or analog signal to a TV set or video monitor via Output 152B.

DVR 102 also includes a Communication Interface 162, through which the DVR 102 communicates with Network 105 via Ethernet, wireless network, modem, or other communications standard. Further, DVR 102 may be integrated into a TV system such that the components described above are housed in a TV set or display apparatus capable of performing the functions of components of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via Encoder 156A and Decoder 156B into a plurality of formats for playback, storage or transfer. DVR 102 can also encrypt or decrypt digital data signals using Encryptor/Decryptor 158 for storage, transfer or playback of the digital data signals.

In one embodiment, DVR 102 communicates with Service Provider 103, which provides program guide data, graphical resources such as brand icons and pictures, service information, software programs, advertisements, ancillary program data, and other forms of data that enable DVR 102 to operate independently of the Service Provider 104 to perform autonomous recording functions. Communication between DVR 102 and Service Provider 104 utilizes an secure distribution architecture to transfer data between the DVR 102 and the Service Provider 104 such that both the service data and the user's privacy are protected.

2.2 Ancillary Data Delivery and Display

DVD versions of programs or movies are selling well in the marketplace, indicating that the consumers prefer the content and format of DVDs. Often, these versions include a substantial amount of ancillary program data such as: deleted scenes, commentary, "making of" clips, music selections, multiple viewing angles, product advertisements, etc. Sometimes, the DVD even includes games or other program data that can only be read from the DVD using a PC.

DVR users can select programs to record using an electronic program guide (EPG). The user selects the program from the EPG and the DVR 102 schedules a recording of the program. The DVR 102 periodically receives updates of the EPG from the service 104. The DVR 102 tracks its list of programs scheduled to be recorded and, if a program's availability time changes on the EPG, the DVR 102 adjusts its recording schedule to accommodate the availability change.

DVR 102 allows users to order movies or music from content providers. The DVR 102 receives available movie and music information and content provider information from the service 104. The DVR 102 displays a series of user interface screens that allows the user to select movies or music from a particular content provider. The DVR 102 then downloads the movie or music over network 105 from a content provider 106. The user may have made several download requests and the DVR queues up the requests. Since movie files are fairly large in size, they take time to download from the content provider 106. The DVR can have several downloads in progress at once, depending on the bandwidth of its network connection and also the download speed from the content provider 106 or multiple content providers. The DVR can speed up downloads by using a technique that allows a file to be downloaded from several different content providers. The DVR assembles the portions of the file received from multiple content sources into the final movie file. This approach also works for smaller files such as music files.

Figure 2:
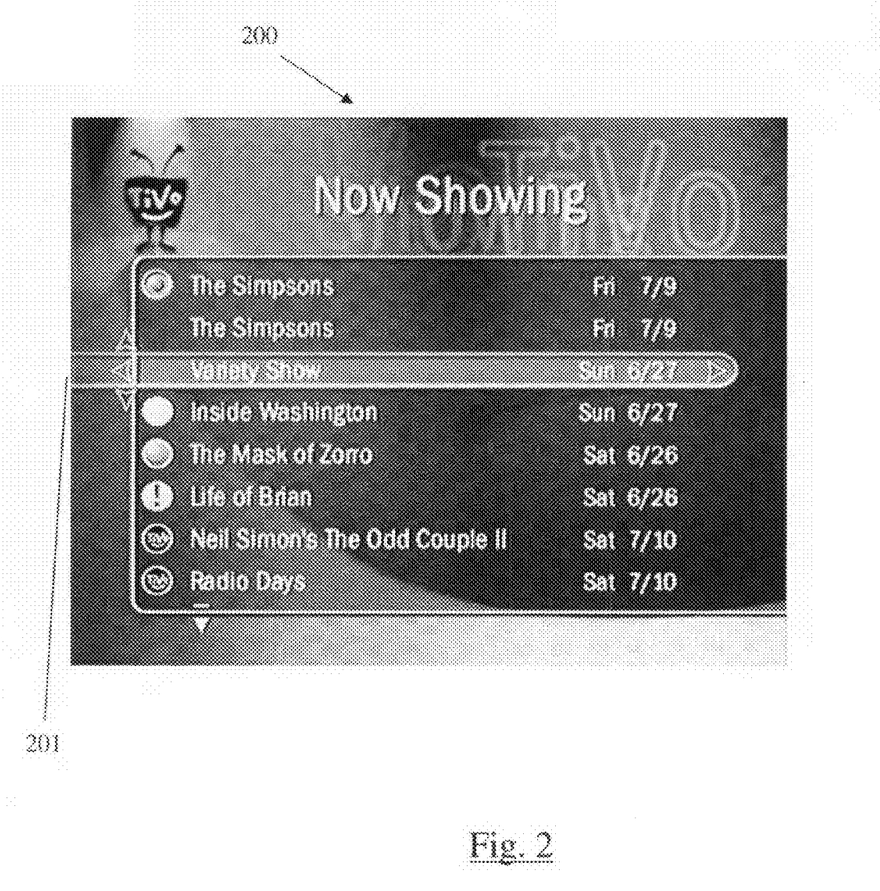
FIG. 2 is a screen shot of a user interface displaying a list of recorded programs according to an embodiment of the invention.

Referring to FIG. 2, in both cases, when the recording or download is complete, DVR 102 adds the recorded program or downloaded movie or music to a list of recorded material 200 that the user can select from 201 and play. The user interacts with the screen using a remote control or other remote input device. The lists may be separated into two user interface screens where one screen lists the recorded programs stored on storage device 164 and the other screen lists downloaded movies or music stored on storage device 164.

When a DVR user requests that a program be recorded or a movie or music be downloaded, two actions are taken: first, the recording is added to a queue of recordings to be performed at some time in the future which is based on program guide data indicating the air time and channel of the program, or download requests are added to a queue for downloading content from content providers; second, a preference item is noted indicating that the user may have some preference for similar programs or program data. These preferences may be used later to automatically record programming that may be of interest to the user.

An advantage that DVR 102 has over other set-top box approaches is that the DVR knows what the user is going to record or has recorded or downloaded onto the DVR. An embodiment automatically downloads and stores ancillary program data that is directly related to, and associated with, a program that has been selected for recording or content requested for download. An embodiment can alternatively automatically download and store ancillary program data that is directly related to, and associated with, a program that has been recorded or content that has been downloaded.

For example, a user might select the program "West Wing" to be recorded on the DVR. Invisible to the user, the DVR 102 contacts the service 104 and provides information such as: the user's preferences, the title of the program scheduled to be recorded, and other information. The amount of information can be as little as the title of the program to be recorded. The service 104 returns an ordered list of ancillary program data related to the program to be recorded to the DVR 102. An embodiment allows the user to specify the type of ancillary program data that he wants downloaded, e.g., director's comments, alternate scenes, music videos, etc. The DVR 102 will then limit its ancillary program data downloads to what the user has requested.

Figure 3:
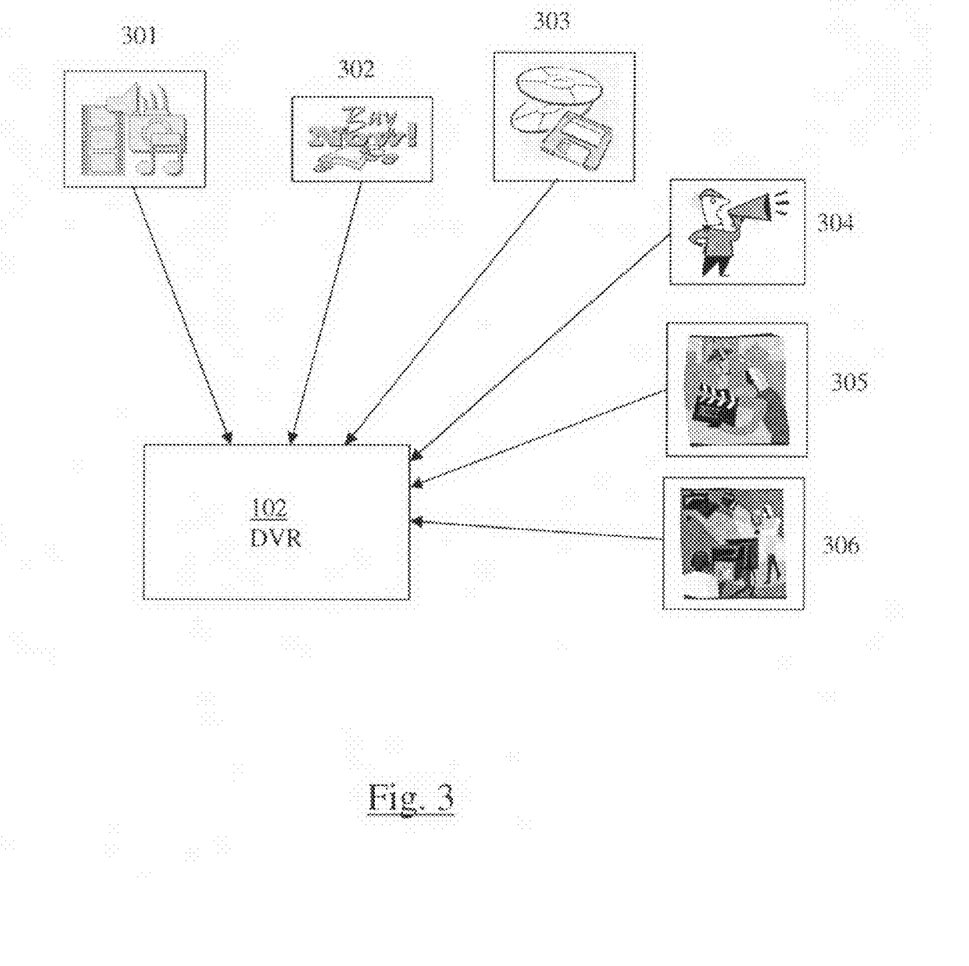
FIG. 3 is a block diagram that illustrates types of ancillary program data that can be downloaded by a multimedia device according to an embodiment of the invention.

Referring to FIG. 3, the ancillary program data might consist of deleted scenes 305, "blooper" clips 305, music videos 301, executable software 303, advertisements 302, additional scenes 306, multiple scene angle content 306, director's comments 304, any special features that a DVD would have available to a user, games, etc. The ancillary program data can be downloaded to storage 164 in the background while the DVR 102 is performing other operations.

In an embodiment, when a user selects a program to view from a program list like the one shown in screen 200, the user is offered the opportunity to browse ancillary program data associated with the program and view an ancillary program data, possibly using the same user screen interface as all other viewing options in order to create a consistent viewing experience. After the user views an ancillary program data, the user is returned to the list of ancillary program data. If there is any ancillary program data that can be viewed while the user is viewing the program or listening to music, the DVR 102 can display an icon overlaid onto the program that indicates that the user can use his remote control to view the ancillary program data. This works when ancillary program data contains alternate scenes, different viewing angles for scenes, director's comments, music videos, etc., that add to the viewing enjoyment or enriches the viewing experience.

After the user has viewed the selected ancillary program data, the DVR 102 will return him back to the point in the program where he selected the ancillary program data. The user does not lose his place in the program material. Alternatively, if the user selected and alternate scene or a different scene angle, then after the alternate scene or a different scene angle is played, the DVR 102 will continue from the point where the replaced scene normally ends, giving the user a seamless viewing experience. The user will not be able to tell that he has left the normal program material to view the alternate scene or a different scene angle.

Ancillary program data can be tagged with information as described in U.S. patent application Ser. No. 09/665,921 owned by the Applicants and incorporated herein by reference, enabling various promotional features, such as scheduling future recordings, video-into-video, video-into-showcase, product purchasing, and so forth. The tags instruct the DVR 102 to display certain prompts or to schedule a recording of a certain program, etc. The user can interact with the DVR using a remote control.

The screen presented to the viewer when selecting the recorded program for viewing might be formatted much like a top-level DVD menu, with choices of ancillary program data highlighted. Alternatively, this "top-level" menu might be dynamically constructed by execution of an ancillary program data that is actually executable software and may have been downloaded with the ancillary program data. This allows the DVR 102 to present a DVD experience for any program material, whether it is from a source such as Showtime or HBO that has no commercials or from a regular broadcast channel. The user can experience the same type of menu experience that he would if he purchased the DVD version of the program or, alternatively, a reduced version of the DVD's menu. The DVR 102 can download all of the content (e.g., menus, extra content, previews, etc.) from a content provider for the original DVD. This also gives the content provider the ability to change the menu structure from the original DVD to an alternative menu structure that the content provider wants the user to experience. There can be a DVD only version and a DVR only version of the menu system.

The DVR 102 might record metadata associated with ancillary programming that would serve as additional user preferences that the DVR 102 would use to create a weighting for ancillary program data similar to the weighting derived for recording suggested programs as described above and further described in U.S. patent application Ser. No. 09/422,121 owned by the Applicants and incorporated herein by reference. The DVR 102 can then download ancillary program data for programs according to the weighting calculated from the metadata, predicting what ancillary program data that the user would like to see.

The list of ancillary program data delivered by the service 104 might be ordered in several ways: according to preferences for types of ancillary program data as derived by the DVR, or according to value accorded to it by third parties through payments to the service 104, e.g., paid promotion. Ordering of the list is important, as the rate at which ancillary program data can be downloaded, the time before viewing the program, or the space available to hold ancillary program data may be limited. Such an ordering ensures the most relevant ancillary program data is downloaded first. Further, the DVR 102 can report to the service 104 as to which ancillary program data was viewed by the user. The service 104 can charge the content provider or an advertiser for each time their ancillary program data is viewed by a user.

In an embodiment, the ancillary programming is deleted when the associated recorded program is deleted. The user might optionally request that various ancillary program data be retained in a manner similar to how user-initiated recorded programs are retained in storage 164. The DVR 102 will store the ancillary program data as long as the user designates (e.g., two weeks, until user deletes, etc.). Similarly, ancillary program data might be deleted automatically to make space available for other programming.

The ancillary program data that is downloaded may instead be some form of link to ancillary program data, such as a URL. The program data would only be downloaded if selected by the user. The ancillary program data download may be queued to occur in the background or it may simply be streamed from the source that a URL points to. An example of immediate access would be playback of an audio sample, such as the theme song of the recorded program, displaying digital photo stills taken on the production set, or accessing a service running on a remote server.

The term "download" is used in an expansive way in this description. For example, the ancillary program data could be broadcast in an analog or digital channel according to a predetermined schedule.

In an embodiment, tags are embedded in the recorded program and refer to ancillary program data. If the program data has been already downloaded (or immediately available via a link), then the opportunity to view it is offered to the user, otherwise no notification is given. The DVR 102 dynamically searches for tags and performs the checks for the downloaded program data as the program is being viewed by the user.

In an embodiment, if a user tunes to a live television channel and views a broadcast program, download of ancillary program data or links begin immediately. There may be some delay built into the DVR 102 before beginning any downloads, in case the user is "surfing" channels. Embedded tags in the program being viewed might refer to ancillary program data and, if it is available to the DVR 102, then it may be offered to the user. If the channel is changed by the user then downloading is halted and any ancillary program data for that program is deleted automatically. Similarly, if the program ends and another begins, the old ancillary program data is discarded and a new list of ancillary program data fetched from the service 104.

As noted above, when the DVR 102 has multiple tuners or a concurrent download of a program (e.g., from a content provider) occurs, the downloading of ancillary program data will be taking place in parallel for the various programs on the tuners and/or download.

In an embodiment, ancillary program data includes executable software (or a link to executable software) for another device, such as a PC. Selection of this program data by the user causes a download to the PC or triggers a PC's Web browser to go to the linked location. The DVR 102 can instruct the PC 108 to start the download. An embodiment also allows the DVR 102 to perform the download of the ancillary program data and then transfer the program data to the PC 108 or the portable device 110.

In an embodiment, ancillary program data embodies actions to be taken by the DVR 102. For example, the ancillary program data might cause an instant message to be sent to an entity or person. In another embodiment, the ancillary program data opens a Voice-over-IP connection to another user, a service agent, or other voice service.

3.0 Implementation Mechanisms—Hardware Overview

Figure 4:
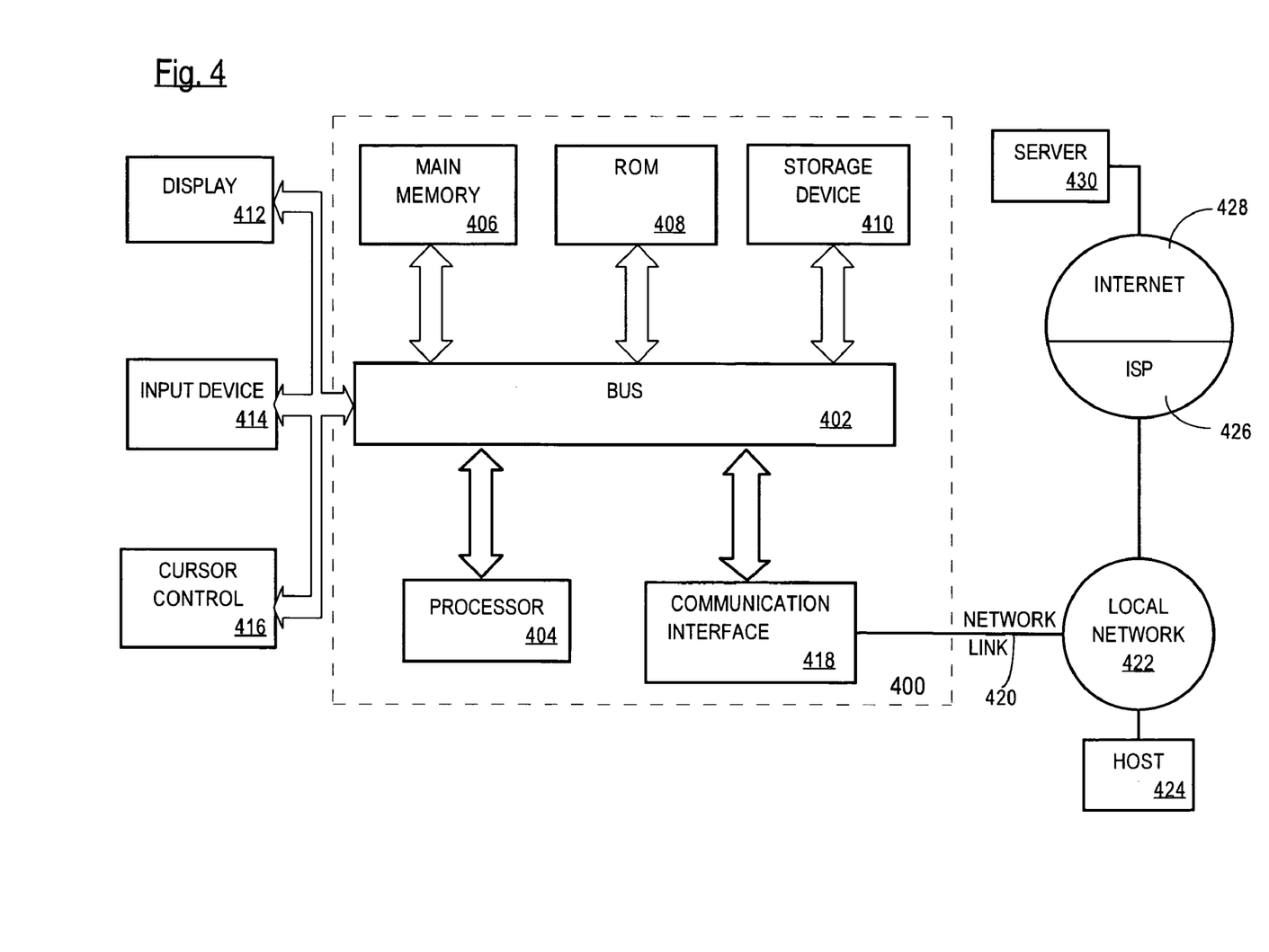
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for electronic commerce and brokering. According to one embodiment of the invention, an electronic commerce and brokering system is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for controlling document access using centrally managed rules as described herein.

The received code may be executed by processor 404 as it is received, and/or stored in storage device 410, or other non-volatile storage for later execution. In this manner, computer system 400 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for distributing ancillary program data to multimedia devices, comprising:
   receiving a request from a user to record or download a specific content at a multimedia device;
   in response to receiving the record or download request, requesting ancillary program data information associated with the requested specific content from a service;
   receiving ancillary program data information from the service at the multimedia device;
   in response to receiving the ancillary program data information, automatically downloading, by the multimedia device, ancillary program data from a source listed in the ancillary program data information to a storage device at the multimedia device;
   recording or downloading, by the multimedia device, the specific content onto the storage device;
   displaying, by the multimedia device, a list of selectable ancillary program data to the user when the user selects the stored specific content for viewing;
   wherein the ancillary program data includes at least one of: deleted scenes, "blooper" clips, "making of" clips, music videos, executable software, advertisements, additional scenes, multiple scene angle content, director's comments, games, any special features that a DVD would have available to a user, or a link to ancillary content; and
   displaying, by the multimedia device, a user-selected ancillary program data.

2. A method as recited in claim 1, further comprising:
   displaying the list of selectable ancillary program data after displaying the user-selected ancillary program data.

3. A method as recited in claim 1, further comprising:
   allowing the user to select an alternate scene or different angle of a scene from the ancillary program data while the user is viewing the selected stored specific content.

4. A method as recited in claim 1, wherein the user specifies types of ancillary program data the he wants downloaded, and wherein the download step limits ancillary program data downloads to user specified types.

5. A method as recited in claim 4, further comprising:
   recording whether the user has viewed certain ancillary program data;
   reporting ancillary program data that the user has viewed to a service; and
   wherein the service charges an advertiser or content provider a fee for every time the advertiser's or content provider's ancillary program data is viewed by a user.

6. A method as recited in claim 1, wherein the ancillary program data information has items listed in a specific order, and wherein an advertiser or content provider pays a service a fee for the service ordering the ancillary program data information in the specific order.

7. A method as recited in claim 1, further comprising:
   deleting the ancillary program data when the stored specific content is deleted from the storage device.

8. A method as recited in claim 1, further comprising:
   wherein the stored specific content contains tags that indicate a source for ancillary program data; and
   downloading ancillary content information from the source.

9. A method as recited in claim 1, further comprising:
   displaying an icon to the user as the user is viewing the stored specific content that indicates that the user can view ancillary program data that adds to the program material viewing enjoyment.

10. An apparatus for distributing ancillary program data to multimedia devices, comprising:
    a subsystem, implemented at least partially in hardware, that receives a request from a user to record or download a specific content at a multimedia device;
    a subsystem, implemented at least partially in hardware, that, in response to receiving the record or download request, requests ancillary program data information associated with the requested specific content from a service;
    a subsystem, implemented at least partially in hardware, that receives ancillary program data information from the service at the multimedia device;
    a subsystem, implemented at least partially in hardware, at the multimedia device, that, in response to receiving the ancillary program data information, automatically downloads, ancillary program data from a source listed in the ancillary program data information to a storage device at the multimedia device;
    a subsystem, implemented at least partially in hardware, at the multimedia device, that records or downloads, the specific content onto the storage device;
    a subsystem, implemented at least partially in hardware, at the multimedia device, that displays, a list of selectable ancillary program data to the user when the user selects the stored specific content for viewing;
    wherein the ancillary program data includes at least one of: deleted scenes, "blooper" clips, "making of" clips, music videos, executable software, advertisements, additional scenes, multiple scene angle content, director's comments, games, any special features that a DVD would have available to a user, or a link to ancillary content; and
    a subsystem, implemented at least partially in hardware, at the multimedia device, that displays a user-selected ancillary program data.

11. An apparatus as recited in claim 10, further comprising:
a subsystem, implemented at least partially in hardware, that displays the list of selectable ancillary program data after displaying the user-selected ancillary program data.

12. An apparatus as recited in claim 10, further comprising:
a subsystem, implemented at least partially in hardware, that allows the user to select an alternate scene or different angle of a scene from the ancillary program data while the user is viewing the selected stored specific content.

13. An apparatus as recited in claim 10, wherein the user specifies types of ancillary program data the he wants downloaded, and wherein the download subsystem limits ancillary program data downloads to user specified types.

14. An apparatus as recited in claim 13, further comprising:
a subsystem, implemented at least partially in hardware, that records whether the user has viewed certain ancillary program data;
a subsystem, implemented at least partially in hardware, that reports ancillary program data that the user has viewed to a service; and
wherein the service charges an advertiser or content provider a fee for every time the advertiser's or content provider's ancillary program data is viewed by a user.

15. An apparatus as recited in claim 10, wherein the ancillary program data information has items listed in a specific order, and wherein an advertiser or content provider pays a service a fee for the service ordering the ancillary program data information in the specific order.

16. An apparatus as recited in claim 10, further comprising:
a subsystem, implemented at least partially in hardware, that deletes the ancillary program data when the stored specific content is deleted from the storage device.

17. An apparatus as recited in claim 10, further comprising:
wherein the stored specific content contains tags that indicate a source for ancillary program data; and
a subsystem, implemented at least partially in hardware, that downloads ancillary content information from the source.

18. A non-transitory computer-readable medium storing one or more sequences of instructions for distributing ancillary program data to multimedia devices, which instructions, when executed by one or more processors, cause the one or more processors to carry out the steps of:
receiving a request from a user to record or download a specific content at a multimedia device;
in response to receiving the record or download request, requesting ancillary program data information associated with the requested specific content from a service;
receiving ancillary program data information from the service at the multimedia device;
in response to receiving the ancillary program data information, automatically downloading, by the multimedia device, ancillary program data from a source listed in the ancillary program data information to a storage device at the multimedia device;
recording or downloading, by the multimedia device, the specific content onto the storage device;
displaying, by the multimedia device, a list of selectable ancillary program data to the user when the user selects the stored specific content for viewing;
wherein the ancillary program data includes any at least one of: deleted scenes, "blooper" clips, "making of" clips, music videos, executable software, advertisements, additional scenes, multiple scene angle content, director's comments, games, any special features that a DVD would have available to a user, or a link to ancillary content; and
displaying, by the multimedia device, a user-selected ancillary program data.

19. A non-transitory computer-readable medium as recited in claim 18, further comprising:
returning the user to the list of selectable ancillary program data after displaying the user-selected ancillary program data.

20. A non-transitory computer-readable medium as recited in claim 18, further comprising:
allowing the user to select an alternate scene or different angle of a scene from the ancillary program data while the user is viewing the selected stored specific content.

21. A non-transitory computer-readable medium as recited in claim 18, wherein the user specifies types of ancillary program data the he wants downloaded, and wherein the download step limits ancillary program data downloads to user specified types.

22. A non-transitory computer-readable medium as recited in claim 21, further comprising:
recording whether the user has viewed certain ancillary program data;
reporting ancillary program data that the user has viewed to a service; and
wherein the service charges an advertiser or content provider a fee for every time the advertiser's or content provider's ancillary program data is viewed by a user.

23. A non-transitory computer-readable medium as recited in claim 18, wherein the ancillary program data information has items listed in a specific order, and wherein an advertiser or content provider pays a service a fee for the service ordering the ancillary program data information in the specific order.

24. A non-transitory computer-readable medium as recited in claim 18, further comprising:
deleting the ancillary program data when the stored specific content is deleted from the storage device.

25. A non-transitory computer-readable medium as recited in claim 18, further comprising:
wherein the stored specific content contains tags that indicate a source for ancillary program data; and
downloading ancillary content information from the source.

26. A method for distributing ancillary program data to multimedia devices, comprising:
identifying a program being viewed by a user;
requesting ancillary program data information associated with the program from a service;
receiving ancillary program data information from the service at the multimedia device;
in response to receiving the ancillary program data information, automatically downloading, by the multimedia device, ancillary program data from a source listed in the ancillary program data information to a storage device at the multimedia device;
indicating, by the multimedia device, to the user that ancillary program data is available for the program;
wherein the ancillary program data includes any at least one of: deleted scenes, "blooper" clips, "making of" clips, music videos, executable software, advertisements, additional scenes, multiple scene angle content, director's comments, games, any special features that a DVD would have available to a user, or a link to ancillary content;

displaying, by the multimedia device, user-selected ancillary program data; and deleting, by the multimedia device, the ancillary program data when the user begins viewing another program.

* * * * *